United States Patent [19]
Sydansk

[11] Patent Number: 5,609,208
[45] Date of Patent: *Mar. 11, 1997

[54] PH DEPENDENT PROCESS FOR RETARDING THE GELATION RATE OF A POLYMER GEL UTILIZED TO REDUCE PERMEABILITY IN OR NEAR A SUBTERRANEAN HYDROCARBON-BEARING FORMATION

[75] Inventor: Robert D. Sydansk, Littleton, Colo.

[73] Assignee: Marathon Oil Company, Findlay, Ohio

[ * ] Notice: The term of this patent shall not extend beyond the expiration date of Pat. No. 5,421,411.

[21] Appl. No.: 481,535

[22] Filed: Jul. 6, 1995

Related U.S. Application Data

[63] Continuation-in-part of Ser. No. 176,737, Jan. 3, 1994, Pat. No. 5,421,411.

[51] Int. Cl.$^6$ ............................................. E21B 33/138
[52] U.S. Cl. ........................... 166/295; 166/300; 507/903; 523/130
[58] Field of Search ..................... 166/270, 294, 166/295, 300; 507/903; 523/130

[56] References Cited

U.S. PATENT DOCUMENTS

| | | | |
|---|---|---|---|
| 3,762,476 | 10/1973 | Gall | 166/294 |
| 4,683,949 | 8/1987 | Sydansk et al. | 166/270 |
| 4,706,754 | 11/1987 | Smith | 166/295 |
| 4,770,245 | 9/1988 | Sydansk | 166/295 |
| 4,917,186 | 4/1990 | Mumallah | 166/295 |
| 5,069,281 | 12/1991 | Tackett, Jr. | 166/295 |
| 5,131,469 | 7/1992 | Lockhart et al. | 166/295 |
| 5,143,958 | 9/1992 | Lockhard et al. | 524/219 |
| 5,181,568 | 1/1993 | McKown et al. | 166/295 X |
| 5,219,475 | 6/1993 | Lockhart et al. | 252/8.551 |
| 5,219,476 | 6/1993 | Lockhart et al. | 252/8.551 |
| 5,338,465 | 8/1994 | Lockhart et al. | 252/8.551 |
| 5,421,411 | 6/1995 | Sydansk | 166/295 |
| 5,431,226 | 7/1995 | Sydansk | 166/295 |

OTHER PUBLICATIONS

Lockhart et al., "A New Gelation Technology for In–Depth Placement of $Cr^{3+}$/Polymer Gels in High–Temperature Reservoirs," SPE/DOE 24194, Apr. 1992.

Lockhart et al., "Gelation–Delaying Additives for $Cr^{3+}$/Polymer Gels," SPE/DOE 25221, Mar. 1993.

*Primary Examiner*—George A. Suchfield
*Attorney, Agent, or Firm*—Jack L. Hummel; Jack E. Ebel

[57] ABSTRACT

A process and composition are provided for permeability reduction in a treatment region to improve hydrocarbon recovery from a hydrocarbon-bearing formation. The process includes placement of a crosslinked polymer gel in the treatment region preceded by surface preparation of a gelation solution which is the gel precursor. The gelation solution contains a crosslinkable polymer, a chromium(III)/carboxylate complex crosslinking agent, a carboxylate salt delaying agent and an aqueous solvent. The gel is placed in the treatment region by injecting the gelation solution into a well bore in fluid communication with the treatment region, displacing it into the desired treatment region and gelling the solution to completion forming the permeability-reducing gel in situ. The gelation rate is retarded in a controlled manner by adjusting the composition or concentration, and correspondingly the pH, of the delaying agent in the gelation solution.

10 Claims, 1 Drawing Sheet

PH DEPENDENT PROCESS FOR RETARDING THE GELATION RATE OF A POLYMER GEL UTILIZED TO REDUCE PERMEABILITY IN OR NEAR A SUBTERRANEAN HYDROCARBON-BEARING FORMATION

The present patent application is a CIP of U.S. Ser. No. 08/176,737, filed on Jan. 3, 1994 now U.S. Pat. No. 5,421,411.

BACKGROUND OF THE INVENTION

1. Technical Field

The invention relates to a process for recovering hydrocarbons from a subterranean formation, and more particularly to a hydrocarbon recovery process using a permeability-reducing agent.

2. Background Information

The utility of crosslinked polymer gels as a permeability-reducing agent in subterranean hydrocarbon-bearing formations to facilitate hydrocarbon recovery therefrom has long been known in the art. U.S. Pat. No. 3,762,476 to Gall is representative of conventional teaching in the art of its time. Gall discloses a conformance improvement treatment process, wherein a permeability-reducing crosslinked polymer gel is formed in situ by injecting an aqueous slug containing a crosslinkable water-soluble polymer into a subterranean treatment region followed in sequence by an aqueous slug containing a crosslinking agent made up of a polyvalent metal cation complexed with a retarding anion. Useful polyvalent metal cations listed in Gall include iron(II), iron(III), aluminum(III), chromium(III), calcium(II), magnesium(II). Useful retarding anions complexed with the cation include citrate, phosphate. acetate, nitrilotriacetate, and tartrate.

Sequential injection of the gel components as separate and distinct slugs into the treatment region is essential to the teaching of treatment processes such as Gall insofar as surface contacting of the polymer and crosslinking agent was believed to cause premature gelation of the gel components prior to reaching the treatment region. If prematurely formed at the surface or in the well bore, placement in the treatment region of the gels taught by Gall was difficult, if not impossible, to achieve. Consequently, sequential injection of the gel components in concept avoided premature gelation by delaying contacting of the components until they were displaced out into the treatment region.

In situ contacting of the polymer and crosslinking agent as required by Gall, nevertheless, proved operationally unattractive in many hydrocarbon recovery applications because of the difficulty in achieving adequate mixing of the gel components in situ. Without adequate mixing, the gels of Gall were poorly formed, resulting in weak and unstable gels that performed ineffectively as permeability-reducing agents.

In the face of conventional teaching represented by Gall, U.S. Pat. No. 4,683,949 to Sydansk et al. identified specific gel components and gelation parameters for a crosslinked polymer gel having utility in a conformance improvement treatment process, whereby the polymer and crosslinking agent of the gel could be mixed at the surface in a homogeneous gelation solution and placed in the treatment region by injection therein as a single slug. Thus, Sydansk et al. overcame the inherent operational limitations of processes such as Gall that required sequential injection and in situ mixing of the gel components. Sydansk et al. was predicated on the finding that a chromium(III)/carboxylate complex crosslinking agent could be mixed with a crosslinkable polymer at the surface to form a gelation solution producing gels that were uniquely stable and had highly predictable gel strengths and gelation times, yet were capable of practical long-term placement in subterranean treatment regions, even in hostile environments. The process of Sydansk et al. successfully enabled formulation of gels having a broad range of physical characteristics for effective conformance improvement treatments under varying in situ conditions.

The teaching of Sydansk et al. has subsequently been adapted to certain specific, typically problematic, conformance improvement treatment applications. For example, in some high temperature or far well bore applications, it has been found that absent the addition of a supplemental delaying agent to the gelation solution, the chromium(III)/carboxylate complex taught by Sydansk et al. excessively crosslinks the polymer before the gelation solution reaches the desired treatment region, increasing the difficulty of placing the gel in the treatment region.

Accordingly, U.S. Pat. No. 4,706,754 to Smith addressed specific treatment applications, wherein longer gel times are advantageously provided. Smith discloses the addition of a supplemental delaying agent to a gelation solution containing a water-soluble crosslinkable polymer and a metal/carboxylate complex crosslinking agent. The supplemental delaying agent disclosed by Smith comprises a plurality of carboxylate anions in the form of a carboxylic acid that delays gelation of the polymer and crosslinking agent, thereby facilitating heretofore problematic placement of the crosslinked gels in high temperature or remote treatment regions.

U.S. Pat. Nos. 5,131,469 and 5,143,958 to Lockhart et al. likewise teach gelation solutions containing a crosslinkable polymer, a crosslinking agent, and a plurality of carboxylate anions in the form of a carboxylic acid that performs as a delaying agent. The Lockhart et al. patents, however, teach a crosslinking agent having a crosslinking metal cation in the form of a water-soluble inorganic chromium(III) salt, as distinguishable from Smith wherein the metal cation of the crosslinking agent is in the form of an organic metal/carboxylate complex. The Lockhart et al. patents are further distinguishable from Smith insofar as the Lockhart et al. patents expressly repudiate the utility of the acetate anion as a component of the gelation solutions taught therein, whether the acetate anion is in the form of a chromium(III) complex, acetic acid, or an acetate salt.

Notwithstanding the teaching of the prior art represented by the U.S. patents of Smith and Lockhart et al., a relatively less acidic gelation solution has been found with a controllable gel time to enable placement of the resulting gel in a wide range of subterranean treatment regions. Moreover, the present gelation solution obviates problems experienced by the prior art, wherein acidic gelation solutions are often corrosive when contacting surface or well bore equipment and tubing. The present gelation solution obviates another problem encountered with acidic gelation solutions, wherein certain polymers, otherwise useful in gelation solutions, tend to autohydrolyze in an acidic environment. Acid catalyzes the autohydrolysis reaction of the polymer, at times causing premature gelation of the gelation solution. Acidic gelation solutions can also react with the reservoir rock, particularly carbonates, acidizing the rock which causes loss of the acid component and which also causes complicated and undesirable side reactions with the rock. As such a need has existed for an effective gelation solution that is relatively noncorrosive to the oil field tubing and equipment, does not promote autohydrolysis of the polymer to be crosslinked, and is substantially unreactive with the reservoir rock, yet can be formulated with a sufficient gel time for placement in remote or high temperature treatment regions.

It is, therefore, an object of the present invention to provide a process forming a crosslinked polymer gel for permeability reduction in a treatment region. It is also an object of the present invention to provide a gelation solution composition that forms such a crosslinked polymer gel. It is a further object of the present invention to retard the gelation rate of the gelation solution by supplementing the gelation solution with a delaying agent. It is another object of the present invention to control the degree of gelation rate retardation in a predictable and controllable manner by selectively increasing or decreasing the concentration of delaying agent in the gelation solution and correspondingly adjusting the pH of the gelation solution. It is another object of the present invention to control the degree of gelation rate retardation by selecting the ligand strength of the delaying agent relative to the ligand strength of the crosslinking agent. It is still another object of the present invention to provide such a gelation solution that is relatively noncorrosive to the oil field tubing and equipment. It is yet another object of the present invention to provide such a gelation solution that does not tend to induce autohydrolysis of the crosslinkable polymer contained therein. It is another object of the present invention to provide such a gelation solution that is substantially unreactive with the reservoir rock.

SUMMARY OF THE INVENTION

The present invention is a process and composition for improving hydrocarbon recovery from a subterranean hydrocarbon-bearing formation. Improved hydrocarbon recovery is effectuated in accordance with the present invention by employing a specific composition to reduce permeability within a desired treatment region of a subterranean formation in fluid communication with a fluid injection well bore or a hydrocarbon production well bore. Encompassed within the scope of the invention are conformance improvement treatment, coning treatment, fluid shutoff treatment, squeeze and recompletion treatment, and squeeze cement treatment applications.

The permeability-reducing composition is used in a conformance improvement treatment to reduce the permeability of a high permeability region in the formation. The treatment particularly improves vertical and areal conformance within the formation and correspondingly improves flow profiles and sweep efficiencies of injected or produced fluids in the formation. The treatment can also prevent the diversion of injected fluids away from a hydrocarbon-producing zone into adjacent thief zones of or proximate to the formation.

The permeability-reducing composition is used in a coning treatment to selectively block the flow of unwanted fluids into a hydrocarbon-producing zone of the formation from a second proximate zone or formation, such as from an underlying aquifer. Alternatively, the coning treatment selectively blocks the flow of unwanted fluids into the hydrocarbon-producing zone from an overlying gas cap. Typically, the proximate zone or formation being partially or completely isolated from the hydrocarbon-producing zone contains producible, but unwanted, fluids such as water or gas. The coning treatment prevents or reduces intrusion of the unwanted fluids into the hydrocarbon producing zone under a water or gas coning mechanism.

The permeability-reducing composition is used in a squeeze cement treatment to shut off and abandon a zone of the formation in direct communication with the well bore penetrating the formation or to shut off a volume proximate to the well bore. Squeeze cementing enables essentially total fluid shutoff of the abandoned zone or proximate volume so that the well bore can be recompleted or reconfigured for more effective post-treatment utilization. The permeability-reducing composition can also be used in a squeeze cement treatment to remediate small well bore leaks by shutting off small openings or annuli in or along the well bore.

The permeability-reducing composition is used in a fluid shutoff treatment to reduce the undesirable flow of a liquid or a gas within a formation. Oftentimes the fluid shutoff treatment is used to reduce the undersirable entry of water or gas into a well bore. In some cases the fluid shutoff treatment is employed in production well bores to reduce the volume of water entering the well bore via channeling. Fluid shutoff treatments may be particularly directed to reducing the flow of fluids from the injection well bore into the production well bore.

The present process, in each of its above-recited applications, requires placement of a crosslinked polymer gel in a desired treatment region of a formation to act as a permeability-reducing agent therein. Placement of the gel is preceded by preparation of a gelation solution at the surface which is a precursor to the gel. The gelation solution contains a crosslinkable polymer, a chromium(III)/carboxylate complex crosslinking agent, a carboxylate salt delaying agent and an aqueous solvent. In a further embodiment, the present invention is the composition of the above-recited gelation solution.

The gel is placed in the desired treatment region by injecting the gelation solution as a homogeneous slug into a well bore in fluid communication with the formation. The gelation solution is displaced into the desired treatment region and gelled to completion forming a permeability-reducing gel therein. The gelation rate is controlled by selecting the concentration and species of carboxylate salt in the gelation solution, and correspondingly the pH of the gelation solution, in accordance with the depth and temperature of the desired treatment region. The salt provides a source of carboxylate anions in the gelation solution that retards the gelation rate as a function of the salt concentration, salt species, and pH of the gelation solution, thereby delaying complete gelation of the gelation solution until it reaches the treatment region.

DESCRIPTION OF PREFERRED EMBODIMENTS

Figure 1:
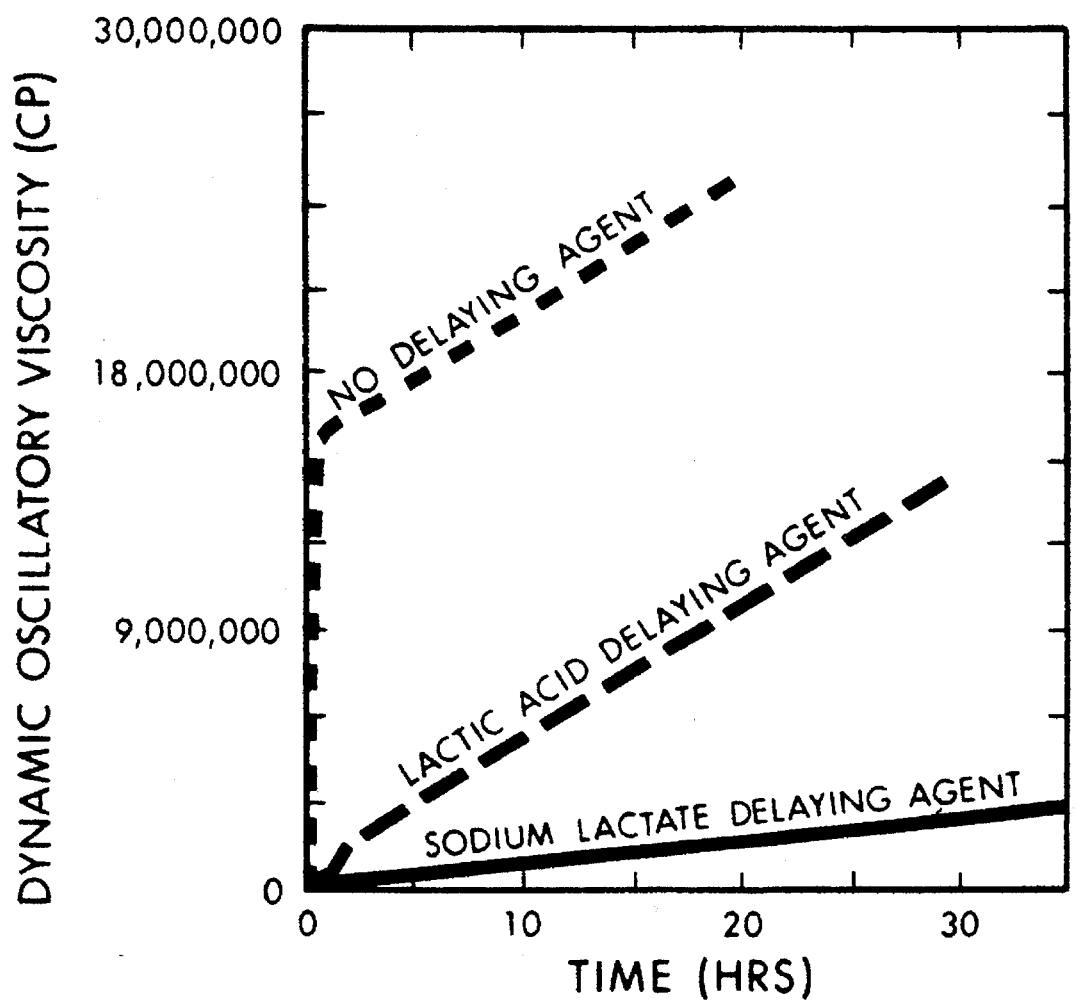
FIG. 1 is a graph illustrating the gelation rate retarding performance of a sodium lactate delaying agent as used in accordance with the present invention in comparison to the gelation rate retarding performance of a lactic acid delaying agent as taught by the prior art.

A number of specific terms are used throughout the specification to describe the process of the present invention and are defined as follows. A "subterranean formation" is a subterranean geological structure consisting essentially of "matrix," and in some instances, "anomalies." The term "subterranean hydrocarbon-bearing formation" is synonymous with the term "reservoir." An "anomaly" is a volume within a formation having very high permeability relative to the matrix. The term "anomaly" is inclusive of such highly permeable volumes as fractures, fracture networks, joints, cracks, fissures, vugs, voids, solution channels, caverns, washouts, cavities, and the like. The "matrix" is generally characterized as substantially continuous, sedimentary geological material having a very low permeability relative to an anomaly. In addition, the matrix is often characterized as competent.

The term "well bore" is defined as a bore hole extending from the earth surface to the subterranean formation. Thus, a well bore is a conduit providing fluid communication between the surface and the subterranean formation penetrated thereby. A production well bore enables the removal of fluids from the subterranean formation to the surface and an injection well bore enables the placement of fluids into the subterranean formation from the surface. It is noted that a given well bore can function interchangeably as a production well bore or an injection well bore depending on whether a fluid is being removed from or placed in the well bore. The term "well" is synonymous with the term "well bore." Other terms used herein have definitions in accordance with the conventional usage of a skilled artisan, unless otherwise defined hereafter.

The process of the present invention comprises preparing a flowing liquid gelation solution at the earthen surface, injecting the gelation solution into a well bore in fluid communication with a subterranean formation, displacing the gelation solution into a desired treatment region of the formation and gelling the solution in situ, thereby placing a permeability-reducing gel in the treatment region. As such, the gelation solution is a gel precursor that is transformable from a solution to a gel after being aged to maturity for a predetermined gel time. A "gel" is defined herein as a continuous three-dimensional crosslinked polymeric network integrating a liquid into the interstices of the network.

The gelation solution comprises a crosslinkable polymer, a crosslinking agent, and a delaying agent in solution within an aqueous solvent. Crosslinkable polymers are well known in the art and any water-soluble carboxylate-containing polymer, whether a biopolymer or a synthetic polymer, has utility in the gelation solutions of the present invention. In general, carboxylate-containing polymers having utility herein contain greater than about 3.0 mole % carboxylate groups based on the total moles of monomer in the polymer, preferably greater than about 2.0 mole %, more preferably greater than about 0.5 mole %, and most preferably greater than about 0.1 mole %. The average molecular weight of such polymers is generally in a range between about 10,000 and about 50,000,000, preferably between about 150,000 and about 20,000,000, and most preferably between about 200,000 and about 15,000,000.

Water-soluble carboxylate-containing biopolymers having utility herein include polysaccharides and modified polysaccharides, such as xanthan gum, guar gum, succinogtycan, scleroglycan, polyvinylsaccharides, carboxymethylcellulose, o-carboxychitosans, hycIroxyethylcellulose, hydroxypropylcellulose, and modified starches. Water-soluble carboxylate-containing synthetic polymers having utility herein are preferably acrylamide polymers. Acrylamide polymers are polymers having one or more acrylamide groups and include polyacrylamide (PA), partially hydrolyzed polyacrytamide (PHPA), and copolymers, terpolymers and tetrapolymers of acrylamide. PA, as defined herein, has from 0 mole % to less than about 0.1 mole % of its amide groups hydrolyzed. Although 0 mole % hydrolyzed PA initially lacks any carboxylate groups, it generates carboxylate groups under the conditions of the present process, thereby satisfying the definition of carboxylate-containing polymers having utility within the scope of the present invention. PHPA is defined herein as having at least about 0.1 mole % of its amide groups hydrolyzed. Included within the definition of PHPA, are copolymers of acrylamide and acrylate.

Crosslinking agents having utility in the present gelation solution are water-soluble complexes containing a reactive transition metal cation and one or more organic carboxylate anions. The term "carboxylate anion" as used herein encompasses carboxylate anionic species including mono-carboxylate anions, such as acetate, polycarboxylate anions, such as malonate, and substituted derivatives of carboxylate anions, such as glycolate and lactate. The carboxylate anions are generally obtained from the corresponding acids or salts thereof. Preferred among such crosslinking agents are those including one or more chromium(III) cations complexed with one or more carboxylate anions. An example of a preferred crosslinking agent is one or more chromium(III) cations complexed with one or more acetate anions, as taught in U.S. Pat. No. 4,683,949 which is incorporated herein by reference.

Delaying agents having utility in the gelation solution of the present invention are carboxylate-anion containing compositions, and in particular water-soluble salts of carboxylate anions. The carboxylate anion of the salt can be the same species as the carboxylate anion of the crosslinking agent or can be a different species. Preferred delaying agents in the practice of the present invention are salts of acetate, lactate, malonate, and glycolate. Of the preferred delaying agents, malonate has the highest degree of ligand strength and acetate the lowest with glycolate and lactate being of intermediate strength. Among the more preferred delaying agents are acetate and lactate salts, such as ammonium acetate, potassium acetate, sodium acetate, ammonium lactate, potassium lactate, and sodium lactate.

The aqueous solvent of the gelation solution is substantially any aqueous liquid capable of forming a solution with the selected polymer, crosslinking agent and delaying agent. The term "solution" as used herein, in addition to true solutions, is intended to broadly encompass dispersions, emulsions, or any other homogeneous mixture of the gelation solution components in the aqueous solvent. The solvent is preferably either a fresh water or a brine, such as sea water or a produced water from the subterranean formation. Produced water can be advantageous because of its low-cost availability and because it enables the practitioner to return the produced water to the formation, thereby eliminating disposal thereof.

The gelation solution is prepared by admixing all of the solution components, including the polymer, crosslinking agent, delaying agent and solvent, together at the surface to form a homogeneous injectable fluid. Surface admixing broadly encompasses batch mixing the components in bulk and subsequently injecting the resulting gelation solution into the well bore or mixing the components in-line near the well head and injecting the gelation solution into the well bore.

Although the order of mixing the solution components is not specific to the practice of the present invention, it is preferable to mix the delaying agent in solution with the polymer or crosslinking agent before contacting the crosslinking agent and polymer. Thus, for example, surface admixing is accomplished by combining the delaying agent and polymer in the selected aqueous solvent. The components can initially be in a solid or liquid state, although, as taught herein, the crosslinking agent is to be added to the gelation solution in the form of a chromium(III)/carboxylate complex, and the delaying agent is to be added to the gelation solution in the form of a carboxylate salt. Forms of the preferred chromium(III)lacerate complex crosslinking agent are solid $CrAc_3$, solid $CrAc_3 \cdot H_2O$, solid $Cr_3Ac_7(OH)_2$ or a solution labeled "Chromic Acetate 50% Solution" that is commercially available, for example, from McGean-Rohco, Inc., 50 Public Square, Suite 1250, Cleveland, Ohio 44113, U.S.A. Upon combining the delaying agent and polymer in solution, the resulting solution is mixed with the crosslinking agent to obtain the gelation solution.

It is further apparent that other mixing sequences are possible and fall within the scope of the present invention. For example, the delaying agent can be added to the crosslinking agent followed by addition of the polymer. Alternatively, the crosslinking agent can be added to the polymer followed by addition of the delaying agent. In any of the above-recited sequences, the solute components can be mixed dry, subsequently adding the aqueous solvent thereto, or the solute components can be mixed while in solution with the aqueous solvent.

The polymer concentration of the resulting gelation solution is generally at least about 500 ppm, preferably at least about 2,000 ppm, and most preferably within a range between about 5,000 ppm and about 100,000 ppm. The chromium(III) cation concentration in the solution is generally between about 10 ppm and about 20,000 ppm, and preferably between about 20 ppm and about 4,000 ppm. The delaying agent concentration in the gelation solution is generally sufficient to create a significant increase in the pH of the gelation solution relative to the pH of a substantially identical gelation solution absent the delaying agent. As such, the delaying agent concentration in the gelation solution is typically at least about 13,000 ppm and sometimes at least about 25,000 ppm.

The crosslinking agent and delaying agent are present in amounts such that the mole ratio of total carboxylate anions from both the crosslinking agent and delaying agent to chromium(III) cations in the gelation solution is typically greater than about 7:1 and oftentimes greater than about 8:1. Correspondingly, the mole ratio of carboxylate anions from the delaying agent alone (excluding the carboxylate anions from the crosslinking agent) to chromium(III) cations in the gelation solution is typically greater than about 4:1 and oftentimes greater than about 5:1.

The gelation solution of the present invention has utility in substantially any permeability-reduction treatment related to hydrocarbon recovery. Permeability-reduction treatments can be alternatively termed fluid flow capacity-reduction treatments, and include inter alia conformance improvement treatments, fluid shutoff treatments, squeeze and recompletion treatments, and squeeze cement treatments. Such treatments can be applied in accordance with the present invention as either a near well bore treatment or a far well bore treatment, wherein the near well bore is defined herein as extending a radial distance of about 3 meters or less from the well bore and the far well bore is defined as extending a radial distance of greater than about 3 meters from the well bore.

In the practice of a conformance improvement treatment, the gelation solution is injected into a well bore in fluid communication with a subterranean hydrocarbon-bearing formation. Although the well bore can be either an injection or a production well bore, it is often an injection well bore in conformance improvement treatment applications. The gelation solution is displaced from the well bore into the desired treatment region that is often a zone (also termed a horizontal stratum) containing higher permeability matrix proximate to the lower permeability hydrocarbon producing zone. The treatment region can alternatively be a high permeability anomaly in the hydrocarbon producing zone or a zone proximate thereto. The crosslinking agent of the gelation solution effectuates crosslinking between appropriate sites of the same or other polymer molecules to create the network structure of the gel. The terms "crosslinking", "gelling" and "gelation" are used synonymously herein. Partial crosslinking of the polymer by the crosslinking agent may occur in the gelation solution before the solution reaches the treatment region, but complete crosslinking resulting in gel formation is delayed in accordance with the present invention by means of the delaying agent until at least a substantial portion of the gelation solution is in place in the treatment region.

Although the present invention is not dependent on any specific mechanism, it is known that the crosslinking or gelation reaction is controlled by a number of functionally interdependent parameters. In particular, it is known that the rate of the crosslinking reaction. i.e., polymer gelation rate, is inter alia a function of the reaction temperature and of the carboxylate concentration of the polymer. (The carboxylate concentration of an acrylamide polymer is expressed as mole % hydrolysis.) Accordingly, when all other gelation parameters are held constant, the gelation rate is decelerated by decreasing the reaction temperature and/or decreasing the carboxylate concentration of the polymer.

The carboxylate concentration of the polymer is generally within the control of the practitioner by preselecting the specific polymer feed of the gelation solution. The reaction temperature, however, is less amenable to control by the practitioner because the reaction temperature is typically the temperature of the subterranean treatment environment. Consequently, if one desires to reduce the gelation rate of a given gelation solution in a relatively high temperature subterranean environment, it is usually more feasible to add a carboxylate anion-containing delaying agent to the gelation solution rather than reduce the temperature of the reaction environment. Subterranean temperatures deemed relatively high within the scope of the present invention are typically temperatures greater than about 70° C., preferably greater than about 80° C., and more preferably greater than about 100° C.

The carboxylate anion-containing delaying agent is believed to decrease the gelation rate by impeding the rate-controlling step of the crosslinking reaction. The rate-controlling step is thought to be a ligand exchange step, wherein a carboxylate anion dissociates from the crosslinking agent at a ligand exchange site and a carboxylate anion of the polymer is exchanged into the structure of the crosslinking agent at the site. The crosslinking reaction is retarded in the presence of a carboxylate anion-containing delaying agent, however, because the carboxylate anions of the delaying agent compete with the carboxylate anions of the polymer for the ligand exchange sites on the crosslinking agent. Therefore, the rate of polymer gelation is advantageously retarded by selecting a carboxylate anion of the delaying agent having a higher ligand strength than the carboxylate anions of the crosslinking agent or polymer which favors the exchange of carboxylate anions from the delaying agent, rather than from the polymer, into the crosslinking agent. Alternatively, the polymer gelation rate is retarded by increasing the number of carboxylate anions of the delaying agent in the gelation solution which likewise favors the exchange of carboxylate anions from the delaying agent into the crosslinking agent.

In summary, it has been found that the gelation rate is retarded to a greater degree as the number of carboxylate anions of the delaying agent is increased relative to the number of chromium(III) cations in the gelation solution for a given species of the carboxylate anion of the delaying agent. Conversely, the gelation rate is retarded to a lesser degree as the number of carboxylate anions of the delaying agent is decreased relative to the number of chromium(III) cations in the gelation solution. Thus, the gelation rate and correspondingly the gel time of the solution can be controlled by adjusting the concentration of a given carboxylate anion-containing delaying agent relative to the concentration of a given crosslinking agent in the gelation solution.

At a fixed ratio of carboxylate anions of the delaying agent to chromium(III) cations in the gelation solution, the gelation rate is retarded to a greater degree, if a carboxylate anion of the delaying agent is selected having a high ligand strength. Conversely, the gelation rate is retarded to a lesser degree, if a carboxylate anion of the delaying agent is selected having a low ligand strength. Thus, the gelation rate and correspondingly the gel time of the solution can likewise be controlled by selecting the carboxylate anion species of the delaying agent as a function of its ligand strength.

A competing effect, however, has been identified that can diminish the utility of the carboxylate anion-containing delaying agent, particularly in relatively high temperature and relatively low pH environments (i.e., a temperature above at least about 70° C. and a pH below about 5.0). High temperature in combination with relatively low pH, catalyzes autohydrolysis of the acrylamide groups of the polymer, thereby increasing the carboxylate concentration of the polymer. This effect is most apparent where the polymer is PHPA having a relatively low carboxylate concentration, i.e., between about 0.1 mole % and about 5.0 mole %. and preferably between about 0.1 mole % and about 3.0 mole %. Increasing polymer carboxylate concentration, as noted above, tends to undesirably accelerate the rate of the crosslinking reaction, countering the desirable decelerating effect of the carboxylate anion-containing delaying agent.

It has been found in accordance with the present invention that the above-described undesirable pH effect is particularly apparent where the carboxylate anion-containing delaying agent is a carboxylic acid as taught by the prior art. Although the undesirable pH effect of the carboxylic acid is much less pronounced at relatively low temperatures, the pH effect becomes significant at higher temperatures. When a carboxylic acid delaying agent is employed in a high temperature environment, the low pH of the acid catalyzes autohydrolysis of the acrylamide polymer, increasing the polymer carboxylate concentration at a detrimental rate and correspondingly adversely increasing the gelation rate.

The present process recognizes that this undesirable pH effect can be favorably avoided by substituting a carboxylate salt for the carboxylic acid as the carboxylate anion-containing delaying agent in the gelation solution such that the rate of polymer autohydrolysis is reduced. The carboxylate salt preferably raises the pH of the gelation solution to within a range having a lower limit of about 5.0 and having an upper limit of about 8.0. This pH range is generally achieved by maintaining the delaying agent in the gelation solution within the above-recited concentration range and/or within the above-recited range of the mole ratio of delaying agent to chromium(III) cations.

In a given gelation solution at a fixed temperature, replacement of the carboxylic acid in the gelation solution with its corresponding carboxylate salt enables the practitioner to achieve an equivalent gel time with a substantially lower delaying agent concentration. Replacement of the carboxylic acid with its corresponding carboxylate salt alternatively enables the practitioner to achieve a substantially longer gel time with an equivalent delaying agent concentration. Generally, it is desirable to retard the gelation rate of the gelation solution to a greater degree when the treatment region for gel placement is in the far well bore region or the temperature of the treatment region is relatively high.

In general, the degree of structure of a gel containing an acrylamide polymer is increased by increasing the polymer concentration of the gelation solution. However, an oftentimes more cost-effective and preferred means for achieving the same effect is to employ a higher molecular weight polymer at a relatively fixed concentration and initial hydrolysis level. Conversely, a reduction in the degree of structure is achieved by using a lower molecular weight polymer. Thus, the skilled practitioner can modify the degree of structure of the present gel in the above-described manner to correspond with the permeability of the treatment region or the differential pressure encountered within the treatment region.

In any case, complete crosslinking is achieved when either substantially all of the crosslinking agent or substantially all of the polymer crosslinking sites are consumed as the gelation solution is aged. Prior to complete crosslinking, the gelation solution is deemed flowing to the extent it is readily displacable from the well bore and through the formation. After complete crosslinking, the gelation solution is fully transformed to a gel that is at least more resistant to flow than the gelation solution and in many cases is non-flowing to the extent it has sufficient strength to resist propagation from the treatment region during subsequent normal oil field operations of hydrocarbon production or hydrocarbon recovery fluid injection.

Upon complete crosslinking, or complete gelation as it is alternatively termed, a sufficient volume of the newly-formed gel resides in place within the treatment region to reduce the permeability thereof. Consequently, hydrocarbon recovery fluids subsequently injected into subterranean hydrocarbon-bearing formations in fluid communication with the treatment region more uniformly sweep the untreated hydrocarbon producing zone in preference over the treatment region. It is additionally noted that the gel produced in accordance with the present invention retains its stability when contacted by liquid hydrocarbons within the formation and has a relatively high structural strength. Furthermore, flowing gels produced hereby typically exhibit relatively low mobilities for flow, while non-flowing gels produced hereby typically exhibit a yield pressure greater than injection or production pressures that are commonly encountered during oil production, thereby enabling the gel to remain in place throughout the production life of the subterranean hydrocarbon-bearing formation. The "yield pressure" is defined herein as the maximum pressure that can be applied in a given geometry to the gel before the gel experiences structural failure and begins to flow.

In the practice of a coning treatment, a fluid shutoff treatment, a squeeze and recompletion treatment, or a squeeze cement treatment, the above-described gelation solution parameters are selected in a manner readily apparent to one skilled in the art to produce a gel satisfying the specific demands of the treatment. For example, squeeze cement treatments are often used to shut off formation zones in fluid communication with the well bore, in a manner requiring greater gel strength than many conformance improvement treatments. Therefore, gels prepared for squeeze cement treatments typically have a substantially greater structural strength and a higher yield pressure than gels prepared for conformance improvement treatments. Placement of the gelation solution for squeeze cement treatments, fluid shutoff treatments, squeeze and recompletion treatments, and coning treatments, however, like conformance improvement treatments, comprises substantially the same steps of injecting the gelation solution into a well bore and displacing the solution into the treatment region where the gel is formed in situ.

Treatment regions in the formation within the scope of the present invention as applied to squeeze and recompletion treatments and squeeze cement treatments include the near well bore and well bore annuli. Treatment regions in the formation within the scope of the present invention as applied to coning treatments include matrix and anomalies such as those that provide fluid communication between a well bore and an aquifer or between a well bore and a gas cap.

The following examples demonstrate the practice and utility of the present invention, but are not to be construed as limiting the scope thereof.

EXAMPLES

In examples 1–11, 13, and 14, samples of gelation solutions are prepared by adding a delaying agent solution to 30 cm$^3$ of an aqueous polymer stock solution. A crosslinking agent solution is then added to form the gelation solution. The active concentration of the crosslinking agent solution is 50% by weight. The polymer is partially hydrolyzed polyacrylamide (PHPA) having a molecular weight of about 500,000 and initially having about 2.8 mole % of its amide groups hydrolyzed. The crosslinking agent is a chromium(III) triacetate complex, and the solvent is fresh tap water. The active polymer concentration of the samples is determined exclusive of the delaying agent solution and crosslinking agent solution. The reported pH values of the samples are measured at room temperature and no additional pH adjusting agents are added during preparation of the samples other than those disclosed herein. The delaying agent composition and other experimental conditions, however, are varied among the examples.

The samples are gelled by placing them in individual thick-walled glass ampules. The ampules have an inside diameter of 2.4 cm and an internal height of about 12 cm. Free oxygen is removed from the samples and the ampule interiors prior to sealing the ampules under vacuum with a glass blowing torch. The sealed ampules are placed in an airbath at preselected temperatures and the samples are aged for preselected periods of time to form gels. While the samples are aging, the ampules are periodically inverted and the strength of the gels are observed as a function of time in accordance with the following gel strength code.

GEL STRENGTH CODE

| Code* Letter | Gel Strength Characterization |
|---|---|
| A | No detectable gel formed. The gel appears to have the same viscosity (fluidity) as the original polymer solution and no gel can be visually detected. |
| B | High flowing gel. The gel appears to be only slightly more viscous than the initial relatively low-viscosity polymer solution. |
| C | Flowing gel. Most of the obviously detectable gel flows to the bottom upon inversion. |
| D | Moderately flowing gel. A small portion (about 5 to 15%) of the gel does not readily flow to the bottom upon inversion - usually characterized as a "tonguing" gel. |
| E | Barely flowing gel. The gel slowly flows to the bottom and/or a significant portion (>15%) of the gel does not flow to the bottom upon inversion. |
| F | Highly deformable nonflowing gel. The gel does not flow to the bottom upon inversion (gel flows to just short of reaching the bottom). |
| G | Moderately deformable nonflowing gel. The gel flows about halfway down to the bottom upon inversion. |
| H | Slightly deformable nonflowing gel. The gel surface only slightly deforms upon inversion. |
| I | Rigid gel. There is no gel-surface deformation upon inversion. |
| S | Syneresis - expulsion of a water phase. |

"+" or "−" are symbols that may be associated with a code letter to denote shades of gel strength characterization.

The experimental variables and the results for each example are set forth below.

EXAMPLE 1

Samples of gelation solutions are prepared in the above-described manner. The active polymer concentration of polymer stock solution used in each sample is 5.0% by weight. The crosslinking agent concentration of each sample excluding the delaying agent is 6200 ppm. The weight ratio of polymer to chromium(III) cation of each sample is 35.2:1. The chromium(III) concentration of each sample excluding the delaying agent is 1410 ppm. The delaying agent is added as an aqueous solution of sodium lactate at a concentration of 60% by weight. The samples are gelled at a temperature of 70° C. The gel strengths for each sample are set forth below in Table 1 as a function of time.

TABLE 1

| | Sample No. | | | | | |
|---|---|---|---|---|---|---|
| | 1 | 2 | 3 | 4 | 5 | 6 |
| Mole Ratio Delaying Agent: Cr(III) | 0:1 | 5.0:1 | 6.0:1 | 7.0:1 | 8.0:1 | 10.0:1 |
| ppm Delaying Agent (wt/fixed wt) | 0 | 15,200 | 18,200 | 21,300 | 24,300 | 30,400 |
| pH of Gelation Solution | 4.8 | 5.2 | 5.5 | 5.6 | 5.8 | 6.0 |
| Aging Time (hrs) | | | Gel Strength Code | | | |
| 0.5 | A | A | A | A | A | A |
| 1.0 | H | A | A | A | A | A |
| 1.5 | I | A | A | A | A | A |
| 2.0 | I | C+ | C− | A | A | A |
| 2.5 | I | H | G | E | A | A |
| 3.0 | I | H+ | G+ | E+ | A | A |
| 4.0 | I | I | I | G− | C− | A |
| 6.0 | I | I | I | G+ | C− | A |
| 8.0 | I | I | I | H− | C− | A |
| 11 | I | I | I | H− | C− | A |
| 24 | I | I | I | I− | C− | A |
| 48 | I | I | I | I | D− | A |

TABLE 1-continued

| | Sample No. | | | | | |
|---|---|---|---|---|---|---|
| | 1 | 2 | 3 | 4 | 5 | 6 |
| 72 | I | I | I | I | D | A |
| 96 | I | I | I | I | G+ | A |
| 120 | I | I | I | I | I | A |
| 168 | I | I | I | I | I | E |
| 300 | I | I | I | I | I | I |
| 2100 | I | I | I | I | I | I |

EXAMPLE 2

Samples of gelation solutions are prepared in the above-described manner. The active polymer concentration of polymer stock solution used in each sample is 5.0% by weight. The crosslinking agent concentration of each sample excluding the delaying agent is 6210 ppm. The weight ratio of polymer to chromium(III) cation of each sample is 35.2:1. The chromium(III) concentration of each sample excluding the delaying agent is 1410 ppm. The delaying agent is added as an aqueous solution of sodium lactate at a concentration of 60% by weight. The samples are gelled at a temperature of 88° C. The gel strengths for each sample are set forth below in Table 2 as a function of time.

TABLE 2

| | Sample No. | | | | | |
|---|---|---|---|---|---|---|
| | 1 | 2 | 3 | 4 | 5 | 6 |
| Mole Ratio Delaying Agent: Cr(III) | 0:1 | 4.0:1 | 6.0:1 | 8.0:1 | 10.0:1 | 13.0:1 |
| ppm Delaying Agent (wt/fixed wt) | 0 | 12,100 | 18,100 | 24,200 | 30,300 | 39,400 |
| Aging Time (hrs) | | | Gel Strength Code | | | |
| 0.5 | C | A+ | A+ | A | A | A |
| 1.0 | I– | A | A | A | A | A |
| 1.5 | I | G | A | A | A | A |
| 2.0 | I | I | F | A | A | A |
| 2.5 | I | I | I– | C+ | A | A |
| 3.0 | I | I | I | D– | A | A |
| 4.0 | I | I | I | D– | A | A |
| 6.0 | I | I | I | E | A | A |
| 8.0 | I | I | I | F+ | C– | A |
| 24 | I | I | I | I | C+ | A |
| 30 | I | I | I | I | D– | A |
| 48 | I | I | I | I | H | A |
| 72 | I | I | I | I | I | E+ |
| 96 | I | I | I | I | I | H |
| 168 | I | I | I | I | I | I |
| 2600 | I | I | I | I | I | I |

EXAMPLE 3

Samples of gelation solutions are prepared in the above-described manner. The active polymer concentration of polymer stock solution used in each sample is 6.0% by weight. The crosslinking agent concentration of each sample excluding the delaying agent is 11,800 ppm. The weight ratio of polymer to chromium(III) cation of each sample is 22.0:1. The chromium(III) concentration of each sample excluding the delaying agent is 2680 ppm. The delaying agent is added as an aqueous solution of sodium lactate at a concentration of 60% by weight. The samples are gelled at a temperature of 104° C. The gel strengths for each sample are set forth below in Table 3 as a function of time.

TABLE 3

| | Sample No. | | | | |
|---|---|---|---|---|---|
| | 1 | 2 | 3 | 4 | 5 |
| Mole Ratio Delaying Agent: Cr(III) | 0:1 | 5.0:1 | 8.0:1 | 11.0:1 | 14.0:1 |
| ppm Delaying Agent (wt/fixed wt) | 0 | 28,800 | 46,100 | 63,400 | 80,700 |
| Aging Time (hrs) | | | Gel Strength Code | | |
| 0.5 | A | A | A | A | A |
| 1.0 | I | C | A | A | A |
| 2.0 | I | F | A | A | A |
| 3.0 | I | I | A | A | A |
| 4.0 | I | I | A | A | A |
| 5.0 | I | I | C | A | A |
| 6.0 | I | I | D | A | A |
| 8.0 | I | I | I | A | A |
| 11 | I | I | I | B– | A |
| 24 | I | I | I | I | A |
| 48 | I | I | I | I | G |
| 72 | I | I | I | I | I |
| 1000 | I | I | I | I | I |

EXAMPLE 4

Samples of gelation solutions are prepared in the above-described manner. The active polymer concentration of polymer stock solution used in each sample is 5.0% by weight. The crosslinking agent concentration of each sample excluding the delaying agent is 60 ppm. The weight ratio of polymer to chromium(III) cation of each sample is 22.1:1. The chromium(III) concentration of each sample excluding the delaying agent is 2240 ppm. The delaying agent is added as an aqueous solution of sodium lactate at a concentration of by weight. The samples are gelled at a temperature of 124° C. The gel strengths for each sample are set forth below in Table 4 as a function of time.

TABLE 4

| | Sample Nos. | | | | |
|---|---|---|---|---|---|
| | 1 | 2 | 3 | 4 | 5 |
| Mole Ratio Delaying Agent: Cr(III) | 0:1 | 6.0:1 | 9.0:1 | 12.0:1 | 18.0:1 |
| ppm Delaying Agent (wt/fixed wt) | 0 | 28,900 | 43,400 | 57,900 | 86,800 |
| Aging Time (hrs) | | | Gel Strength Code | | |
| 0.5 | I | A | A | A | A |
| 1.0 | I | A | A | A | A |
| 1.5 | I | C– | A | A | A |
| 2.0 | I | C+ | A | A | A |
| 3.0 | I | D– | A | A | A |
| 4.0 | I | I | A | A | A |
| 6.0 | I | I | A | A | A |
| 8.0 | I | I | E | A | A |
| 11 | I | I | I | A | A |
| 24 | I | I | I | I | E |
| 30 | I | I | I | I | I |
| 300 | I | I | I | I | I |

The data of Tables 1–4 show the gelation rate retarding effect achieved by means of the sodium lactate delaying agent across a range of temperatures, The data further show that the degree of gelation rate retardation is a function of the lactate anion concentration at a fixed chromium(III) cation concentration. Accordingly, the degree of gelation rate retardation is controlled by varying the mole ratio of the lactate anion to chromium(III) cation.

EXAMPLE 5

Samples of gelation solutions are prepared in the above-described manner. The active polymer concentration of polymer stock solution used in each sample is 5.0% by weight. The delaying agent is added as an aqueous solution of sodium lactate at a concentration of by weight. The samples are gelled at a temperature of 104° C. The gel strengths for each sample are set forth below in Table 5 as a function of time.

TABLE 5

|  | Sample Nos. | |
| --- | --- | --- |
|  | 1 | 2 |
| ppm Crosslinking Agent in Gel (excluding delaying agent) | 6190 | 11,800 |
| wt ratio polymer: Cr(III) | 35.2:1 | 22.0:1 |
| ppm Cr(III) (excluding delaying agent) | 1410 | 2680 |
| Mole Ratio Delaying Agent: Cr(III) | 8.0:1 | 8.0:1 |
| ppm Delaying Agent (wt/fixed wt) | 24,200 | 46,100 |
| Aging Time (hrs) |  |  |
| 1.0 | A | A |
| 2.0 | A | A |
| 3.0 | C+ | A |
| 4.0 | D | A |
| 5.0 | I | C |
| 6.0 | I | D |
| 7.0 | I | I |
| 1200 | I | I |

The data of Table 5 shows the gelation rate retarding effect achieved by means of the sodium lactate delaying agent across a range of chromium(III) cation concentrations. The data further show that as both the chromium(III) cation and lactate anion concentrations are increased at a fixed mole ratio of the lactate anion to chromium(III) cation, the effect of increasing lactate anion concentration on gelation rate dominates over the effect of increasing chromium(III) cation concentration, thereby effectively retarding the gelation rate.

EXAMPLE 6

Samples of gelation solutions are prepared in the above-described manner. The active polymer concentration of polymer stock solution used in each sample is 6.0% by weight. The crosslinking agent concentration of each sample excluding the delaying agent is 19,400 ppm. The weight ratio of polymer to chromium(III) cation of each sample is 13.2:1. The chromium(III) concentration of each sample excluding the delaying agent is 4400 ppm. The delaying agent is added as an aqueous solution of sodium lactate at a concentration of 60% by weight. The samples are gelled at a temperature of 124° C. The gel strengths for each sample are set forth below in Table 6 as a function of time.

TABLE 6

|  | Sample Nos. | | | | |
| --- | --- | --- | --- | --- | --- |
|  | 1 | 2 | 3 | 4 | 5 |
| Mole Ratio Delaying Agent: Cr(III) | 0:1 | 5.0:1 | 10.0:1 | 15.0:1 | 20.0:1 |
| ppm Delaying Agent (wt/fixed wt) | 0 | 47,500 | 95,000 | 142,000 | 190,000 |
| pH of Gelation Solution | 4.7 | 5.3 | 5.5 | 5.6 | 5.8 |
| Aging Time (hrs) | Gel Strength Code | | | | |
| 0.5 | I | A | A | A | A |
| 1.0 | I | C− | A | A | A |
| 2.0 | I | D+ | A | A | A |
| 3.0 | I | E | A | A | A |
| 4.0 | I | I | A | A | A |
| 6.0 | I | I | A | A | A |
| 8.0 | I* | I | C | A | A |
| 11 |  | I | G | A | A |
| 24 |  | I | I | D | A |
| 32 |  | I | I | I | A |
| 48 |  | I | I | I | C |
| 72 |  | I | I | I | I |
| 600 |  | I | I | I | I |

*Experiment terminated for this sample.

EXAMPLE 7

Samples of gelation solutions are prepared in the above-described manner. The active polymer concentration of polymer stock solution used in each sample is 6.0% by weight. The crosslinking agent concentration of each sample excluding the delaying agent is 19,400 ppm. The weight ratio of polymer to chromium(III) cation of each sample is 13.2:1. The chromium(III) concentration of each sample excluding the delaying agent is 4400 ppm. The delaying agent is added as an aqueous solution of lactic acid at a concentration of 60% by weight. The samples are gelled at a temperature of 124° C. The gel strengths for each sample are set forth below in Table 7 as a function of time.

TABLE 7

|  | Sample No. | | | | |
| --- | --- | --- | --- | --- | --- |
|  | 1 | 2 | 3 | 4 | 5 |
| Mole Ratio Delaying Agent: Cr(III) | 0:1 | 5.0:1 | 10.0:1 | 15.0:1 | 20.0:1 |
| ppm Delaying Agent (wt/fixed wt) | 0 | 38,200 | 76,300 | 115,000 | 153,000 |
| pH of Gelation Solution | 4.7 | 2.6 | 2.5 | 2.4 | 2.0 |
| Aging Time (hrs) | Gel Strength Code | | | | |
| 0.5 | I |  |  |  |  |
| 1.0 | I | C− | A+ | A+ | A |
| 2.0 | I | I | C | C | A |
| 3.0 | I | I | D− | C | A |
| 4.0 | I | I | I | F+ | A |
| 5.0 | I | I | I | I− | D |
| 6.0 | I | I | I | I | I |
| 7.0 | I* | I | I | I | I |
| 24 |  | S* | S* | S−* | I |
| 48 |  |  |  |  | I |
| 72 |  |  |  |  | S |

*Experiment terminated for this sample.

The data of Tables 6, and 7 compare the gelation rate retarding effect of the sodium lactate delaying agent as taught by the present invention versus the retarding effect of the lactic acid delaying agent as taught by the prior art. Sodium lactate is shown to be a more effective delaying agent than lactic acid at a fixed mole ratio of lactate anion to chromium(III) cation. Gels formulated with sodium lactate also exhibit better long term stability and performance as compared to gels formed with lactic acid.

EXAMPLE 8

Samples of gelation solutions are prepared in the above-described manner. The active polymer concentration of polymer stock solutin used in each sample is 5.0% by weight. The crosslinking agent concentration of each sample excluding the delaying agent is 6190 ppm. The weight ratio of polymer to chromium(III) cation of each sample is 35.2:1. The chromium(III) concentration of each sample excluding the delaying agent is 1410 ppm. The delaying agent is added as solid sodium glycolate. The samples are gelled at a temperature of 60° C. The gel strengths for each sample are set forth below in Table 8 as a function of time.

TABLE 8

| | Sample No. | | | | | |
|---|---|---|---|---|---|---|
| | 1 | 2 | 3 | 4 | 5 | 6 |
| Mole Ratio Delaying Agent: Cr(III) | 0:1 | 0.60:1 | 1.2:1 | 2.4:1 | 4.8:1 | 9.7:1 |
| ppm Delaying Agent (wt/fixed wt) | 0 | 1,600 | 3,200 | 6,400 | 12,800 | 25,600 |
| Aging Time (hrs) | Gel Strength Code | | | | | |
| 1.0 | A | A | A | A | A | A |
| 2.0 | D– | A | A | A | A | A |
| 2.5 | E | D– | A | A | A | A |
| 3.0 | H | E+ | D | C+ | A | A |
| 4.0 | I | I– | G– | D– | A | A |
| 6.0 | I | I | I | G | A | A |
| 8.0 | I | I | I | H+ | B– | A |
| 24 | I | I | I | H+ | D | A |
| 48 | I | I | I | I– | D | A |
| 72 | I | I | I | I | E | A |
| 216 | I | I | I | I | F– | A |
| 300 | I | I | I | I | F | A |
| 600 | I | I | I | I | I | I |
| 3200 | I | I | I | I | I | I |

EXAMPLE 9

Samples of gelation solutions are prepared in the above-described manner. The active polymer concentration of polymer stock solution used in each sample is 5.0% by weight. The crosslinking agent concentration of each sample excluding the delaying agent is 6190 ppm. The weight ratio of polymer to chromium(III) cation of each sample is 8.81:1. The chromium(III) concentration of each sample excluding the delaying agent is 5470 ppm. The delaying agent added as solid sodium glycolate. The samples are gelled at a temperature of 70° C. The gel strengths for each sample are set forth below in Table 9 as a function of time.

TABLE 9

| | Sample No. | | | | |
|---|---|---|---|---|---|
| | 1 | 2 | 3 | 4 | 5 |
| Mole Ratio Delaying Agent: Cr(III) | 0:1 | 0.60:1 | 8.0:1 | 10.0:1 | 12.0:1 |
| ppm Delaying Agent (wt/fixed wt) | 0 | 16,000 | 21,300 | 26,600 | 32,000 |
| Aging Time (hrs) | Gel Strength Code | | | | |
| 0.5 | C+ | A | A | A | A |
| 1.0 | I | C– | A | A | A |
| 1.5 | I | D | C | B+ | A |
| 2.0 | I | I– | D– | B+ | A |
| 4.0 | I | I | E | C– | A |
| 6.0 | I | I | G | C | A |
| 8.0 | I | I | G+ | C | A |
| 24 | I | I | I | D | A |
| 48 | I | I | I | E+ | C– |
| 96 | I | I | I | F+ | C+ |
| 120 | I | I | I | G+ | D– |
| 144 | I | I | I | I | D– |
| 300 | I | I | I | I | H |
| 408 | I | I | I | I | I |
| 2400 | I | I | I | I | I |

EXAMPLE 10

Samples of gelation solutions are prepared in the above-described manner. The active polymer concentration of polymer stock solution used in each sample is 5.0% by weight. The crosslinking agent concentration of each sample excluding the delaying agent is 6190 ppm. The weight ratio of polymer to chromium(III) cation of each sample is 35.2:1. The chromium(III) concentration of each sample excluding the delaying agent is 1410 ppm. The delaying agent is added as solid sodium glycolate. The samples are gelled at a temperature of 88° C. The gel strengths for each sample are set forth below in Table 10 as a function of time.

TABLE 10

| | Sample No. | | | |
|---|---|---|---|---|
| | 1 | 2 | 3 | 4 |
| Mole Ratio Delaying Agent: Cr(III) | 0:1 | 6.0:1 | 8.0:1 | 10.0:1 |
| ppm Delaying Agent (wt/fixed wt) | 0 | 15,900 | 21,200 | 26,500 |
| pH of Gelation Solution | 4.8 | 5.7 | 5.8 | 5.9 |
| Aging Time (hrs) | Gel Strength Code | | | |
| 0.5 | A | A | A | A |
| 1.0 | I | H– | A | A |
| 1.5 | I | H+ | D– | A |
| 2.0 | I | I– | D+ | A |
| 3.0 | I | I | G+ | C– |
| 4.0 | I | I | G+ | C+ |
| 6.0 | I | I | H+ | D– |
| 8.0 | I | I | I | D |
| 11 | I | I | I | E |
| 24 | I | I | I | G+ |
| 48 | I | I | I | I |
| 1800 | I | I | I | H+ |
| 2500 | I | I | I | H+ |

The data of Tables 8–10 show the gelation rate retarding effect achieved by means of the sodium glycolate delaying agent across a range of temperatures. The data further show that, similar to the lactate anion, the degree of gelation rate retardation is a function of the glycolate anion concentration at a fixed chromium(III) cation concentration. Accordingly, the degree of gelation rate retardation is controlled by varying the mole ratio of the glycolate anion to chromium(III) cation.

EXAMPLE 11

Samples of gelation solutions are prepared in the above-described manner. The active polymer concentration of polymer stock solution used in each sample is 5.0% by weight. The active polymer concentration of each sample excluding the delaying agent is 48,200 ppm. The weight ratio of polymer to chromium(III) cation of each sample is 8.81:1. The chromium(III) concentration of each sample excluding the delaying agent is 5470 ppm. The delaying agent is added as solid sodium malonate. The samples are gelled at a temperature of 124° C. The gel strengths for each sample are set forth below in Table 11 as a function of time.

TABLE 11

|  | Sample No. | | | | |
| --- | --- | --- | --- | --- | --- |
|  | 1 | 2 | 3 | 4 | 5 |
| Mole Ratio Delaying Agent: Cr(III) | 0:1 | 3.0:1 | 4.0:1 | 6.0:1 | 9.0:1 |
| ppm Delaying Agent (wt/fixed wt) | 0 | 52,400 | 68,000 | 105,000 | 157,000 |
| Aging Time (hrs) | Gel Strength Code | | | | |
| 1.0 | I | A | A | A | A |
| 2.0 | I | A | A | A | A |
| 4.0 | I | A | A | A | A |
| 8.0 | I | A | A | A | A |
| 24 | I | A | A | A | A |
| 32 | I | D | A | A | A |
| 48 | I | I | A | A | A |
| 168 | I | I | A | A | A |
| 240 | I | I | I | A | A |
| 380 | I | I | I | C | A* |
| 420 | I | I | I | G |  |
| 600 | I | I | I | I |  |
| 2500 | I | I | I | I |  |

*Experiment terminated for this sample.

The data of Table 11 show the exceptional gelation rate retarding effect achieved by means of the sodium malonate delaying agent at an elevated temperature. The data further show that, similar to the lactate and glycolate anions, the degree of gelation rate retardation is controlled by varying the mole ratio of the malonate anion to chromium(III) cation.

EXAMPLE 12

Two samples of gelation solutions are prepared in Example 12 by adding a delaying agent in solution to an aqueous polymer solution. A crosslinking agent solution is then added to form the gelation solution. The polymer is partially hydrolyzed polyacrytamide (PHPA) having a molecular weight of about 500,000, and initially having about 2.8 mole % of its amide groups hydrolyzed. The concentration of PHPA in the polymer stock solution is 5.0% by weight. The crosslinking agent is chromium(III) triacetate, and the solvent is fresh tap water. The weight ratio of polymer to chromium(III) is 35.2:1. The delaying agent of the first sample is sodium lactate and the delaying agent of the second sample is lactic acid. The pH of the first sample containing the sodium lactate delaying agent is 5.2 and the pH of the second sample containing the lactic acid delaying agent is 3.1. The mole ratio of the delaying agent to chromium(III) in both samples is 6:1. A third sample of a gelation solution is prepared as a control sample in substantially the same manner as the first two samples, but without a delaying agent. The pH of the third sample absent a delaying agent is 4.8. It is noted that addition of the sodium lactate delaying agent in the amount recited herein raises the pH of the gelation solution, whereas addition of the lactic acid delaying agent lowers the pH of the gelation solution relative to the pH of the gelation solution absent the delaying agent.

All three samples are separately gelled in a Rheometrics Pressure Rheometer at a pressure of 2070 kPa and a temperature of 88° C. The dynamic oscillatory conditions are 0.1 rad./sec (about 0.1 $sec^{-1}$ shear rate) and 10% strain. The dynamic oscillatory viscosity is measured as a function of time for each sample. It is noted that the rate of dynamic oscillatory viscosity increase with time is proportional to the gelation rate and that the final equilibrium viscosity is a measure of the elastic strength of the gel. It is further noted that the dynamic oscillatory viscosities of the present samples are dominated by the elastic component, while the shear component is nearly negligible. The results shown in FIG. 1 indicate that both the sodium lactate delaying agent and the lactic acid delaying agent substantially retard the rate of gelation in a gelation solution when compared to a gelation solution containing no delaying agent. The results further show that under these conditions sodium lactate is much more effective than lactic acid in retarding the gelation rate.

EXAMPLE 13

Samples of gelation solutions are prepared in the above-described manner of Examples 1–11. The active polymer concentration of each sample is 5% by weight. The crosslinking agent concentration of each sample excluding the delaying agent is 6190 ppm. The weight ratio of polymer to chromium(III) cation in each sample is 35.2:1. The chromium(III) concentration of each sample excluding the delaying agent is 1410 ppm. The delaying agent solution is added to the gelation solution either as an aqueous solution of sodium lactate or lactic acid at a concentration of 60% by weight. The pH of the samples is measured at room temperature, but the samples are gelled at a temperature of 70° C. The gel strengths for each sample are set forth below in Table 12 as a function of time.

TABLE 12

|  | Sample No. | | | |
| --- | --- | --- | --- | --- |
|  | 1 | 2 | 3 | 4 |
| Retarding Agent | Sodium Lactate | Lactic Acid | Sodium Lactate | Lactic Acid |
| Mole Ratio Delaying Agent: Cr(III) | 5.0:1 | 5.0:1 | 8.0:1 | 8.0:1 |
| ppm Delaying Agent (wt/fixed wt) | 15,200 | 12,200 | 24,300 | 20,000 |
| pH of Gelation Solution | 5.2 | 2.8 | 5.6 | 2.5 |
| Aging Time (hrs.) | Gel Strength Code | | | |
| 1.0 | A | A | A | A |
| 1.5 | A | A | A | A |
| 2.0 | C | A | A | A |

TABLE 12-continued

|  | Sample No. | | | |
|---|---|---|---|---|
|  | 1 | 2 | 3 | 4 |
| 3.0 | H | D | A | A |
| 4.0 | I | I | A | A |
| 6.0 | I | I | A | C |
| 8.0 | I | I | A | D |
| 11 | I | I | C | G |
| 24 | I | I | D | I |
| 48 | I | I | E | I |
| 72 | I | I | I | I |
| 168 | I | I | I | I |
| 1200 | I | I | I | I |

The data of Table 12 show that at a relatively low temperature (i.e., 70° C. or less). the gelation rate retarding effect achieved by the lactic acid delaying agent and the sodium lactate delaying agent is somewhat comparable for the same mole ratio of delaying agent to chromium(III), although sample numbers 1 and 2 are more comparable than sample numbers 3 and 4. It is noted that samples 1 and 2 exhibit a lower mole ratio of delaying agent to chromium(III) and a lower delaying agent concentration than samples 3 and 4. It is further noted that sample 2 exhibits a higher pH than sample 4.

EXAMPLE 14

Samples of gelation solutions are prepared in the above-described manner of Examples 1–11. The active polymer concentration of each sample is 5% by weight. The crosslinking agent concentration of each sample excluding the delaying agent is 6190 ppm. The weight ratio of polymer to chromium(III) cation in each sample is 35.2:1. The chromium(III) concentration of each sample excluding the delaying agent is 1410 ppm. The delaying agent solution is added to the gelation solution either as an aqueous solution of sodium lactate or lactic acid at a concentration of 60% by weight. The pH of the samples is measured at room temperature, but the samples are gelled at a temperature of 104° C. The gel strengths for each sample are set forth below in Table 13 as a function of time.

TABLE 13

|  | Sample No. | | | |
|---|---|---|---|---|
|  | 1 | 2 | 3 | 4 |
| Retarding Agent | Sodium Lactate | Lactic Acid | Sodium Lactate | Lactic Acid |
| Mole Ratio Delaying Agent: Cr(III) | 4.0:1 | 4.0:1 | 13.0:1 | 13.0:1 |
| ppm Delaying Agent (wt/fixed wt) | 12,100 | 9,700 | 39,400 | 31,700 |
| pH of Gelation Solution | 5.6 | 3.5 | 6.0 | 2.7 |
| Aging Time (hrs.) | Gel Strength Code | | | |
| 1.0 | A | A | A | A |
| 1.5 | H | C | A | A |
| 2.0 | I | D | A | A |
| 2.5 | I | I | A | A |
| 3.0 | I | I | A | A |
| 5.0 | I | I | A | A |
| 5.5 | I | I | A | C |
| 7.0 | I | I | A | D |
| 8.0 | I | I | A | E |
| 11 | I | I | A | H |
| 22 | I | I | G | I |
| 32 | I | I | H | I |

TABLE 13-continued

|  | Sample No. | | | |
|---|---|---|---|---|
|  | 1 | 2 | 3 | 4 |
| 48 | I | I | I | I |
| 168 | I | I | I | I |
| 600 | I | I | I | I |

In a comparison of samples 1 and 2, the data show that even at a relatively high temperature (i.e., greater than 70° C.), the gelation rate retarding effect achieved by the lactic acid delaying agent and the sodium lactate delaying agent are somewhat comparable for the same mole ratio of delaying agent to chromium(III) at a relatively low mole ratio of delaying agent to chromium(III) (i.e.. about 4:1 or less), and at a relatively low delaying agent concentration (i.e., less than about 13,000 ppm). Samples 3 and 4, however, show that at the relatively high concentrations of delaying agent required to achieve satisfactory gelation delays at relatively high temperatures, the gelation rate retarding effect achieved by the lactic acid delaying agent is substantially diminished in comparison to its corresponding salt delaying agent, sodium lactate, for the same molar ratio of delaying agent to chromium(III). It is noted that the pH of sample 4 containing lactic acid is depressed to 2.7 which is substantially below the operable range of the present process.

While the foregoing preferred embodiments of the invention have been described and shown, it is understood that alternatives and modifications, such as those suggested and others, may be made thereto and fall within the scope of the present invention.

I claim:

1. A process for substantially reducing the permeability of a treatment region below an earthen surface to facilitate the recovery of hydrocarbons from beneath the earthen surface, the process comprising:
   a) mixing a gelation solution at an earthen surface, wherein said gelation solution consists essentially of:
      i) a carboxylate-containing polymer,
      ii) a chromium(III) complex having one or more chromium(III) cations and one or more carboxylate anions,
      iii) a salt having one or more carboxylate anions, and
      iv) an aqueous solvent,
   b) placing said gelation solution into a treatment region beneath the earthen surface; and
   c) gelling said gelation solution to produce a gel that substantially reduces the permeability of said treatment region.

2. The process of claim 1 wherein said gelation solution has a pH between about 5 and about 8.

3. The process of claim 1 wherein said treatment region has a temperature greater than about 70° C.

4. The process of claim 1 wherein said carboxylate-containing polymer is partially hydrolyzed polyacrylamide.

5. The process of claim 1 wherein said carboxylate-containing polymer has greater than about 0.1 mole % carboxylate groups.

6. The process of claim 1 wherein said one or more carboxylate anions of said salt is selected from the group consisting of acetate, lactate, glycolate, malonate, and mixtures thereof.

7. The process of claim 1 wherein said one or more carboxylate anions of said complex is selected from the group consisting of acetate, lactate, glycolate, malonate, and mixtures thereof.

8. The process of claim 1 wherein said one or more carboxylate anions of said salt is lactate.

9. The process of claim 1 wherein said one or more carboxylate anions of said complex is acetate.

10. A process for substantially reducing the permeability of a treatment region below an earthen surface penetrated by a well bore to facilitate the recovery of hydrocarbons from beneath the earthen surface, the process comprising:

a) mixing a gelation solution at an earthen surface, wherein said gelation solution is capable of forming a crosslinked polymer gel at a controlled gelation rate and said gelation solution includes:

i) a water-soluble carboxylate-containing polymer having at least about 0.1 mole % carboxylate groups, ii) a crosslinking agent formed from a chromium(III) complex having one or more carboxylate anions selected from the group consisting of mono-carboxylates, poly-carboxylates, substituted derivatives of mono- and poly-carboxylates, and mixtures thereof, iii) a delaying agent formed from a salt having one or more carboxylate anions selected from the group consisting of mono-carboxylates, poly-carboxylates, and substituted derivatives of mono- and poly- carboxylates capable of controlling the gelation rate of said gelation solution by retarding the crosslinking reaction rate of said carboxylate-containing polymer and said crosslinking agent in the presence of said delaying agent, wherein said delaying agent is present in said gelation solution in an amount sufficient to raise the pH of said gelation solution relative to the pH of said gelation solution absent said delaying agent, and iv) an aqueous solvent, b) injecting said gelation solution into a wellbore in fluid communication with a treatment region beneath the earthen surface, wherein said treatment region has a relatively high temperature;

c) displacing said gelation solution into said treatment region while delaying substantial gelation of said gelation solution by retarding the crosslinking reaction rate of said carboxylate-containing polymer and said crosslinking agent until said gelation solution is in place in said relatively high temperature treatment region;

d) substantially gelling said gelation solution to produce said crosslinked polymer gel that substantially reduces the permeability of said treatment region; and e) recovering hydrocarbons from beneath the earthen surface without substantially displacing said crosslinked polymer gel from said relatively high temperature treatment region to said earthen surface.

* * * * *

UNITED STATES PATENT AND TRADEMARK OFFICE
CERTIFICATE OF CORRECTION

PATENT NO. : 5,609,208
DATED : March 11, 1997
INVENTOR(S) : Robert D. Sydansk

It is certified that error appears in the above-indentified patent and that said Letters Patent is hereby corrected as shown below:

Col. 5, line 54-55: Delete "succinogtycan" and insert --succinoglycan--.
Col. 5, line 56 : Delete "hyclroxyethylcellulose" and insert—hydroxyethylocellulose--.
Col. 5, line 62 : Delete "polyacrytamide" and insert --polyacrylamide--.
Col. 7, line 5 : Delete "chromium(III)lacerate" and insert --chromium(III)/acetate--.
Col. 14, line 34 : Delete "60" and insert --9860--.
Col. 14, line 39 : Following "of" at the first occurrence insert --60%--.
Col. 15, line 1 : Following "temperatures" delete "," and insert --.--.
Col. 15, line 15 : Following "concentration of" insert --60%--.
Col. 17, line 1 : Following "6" delete ",".

Signed and Sealed this

Second Day of March, 1999

Attest:

Q. TODD DICKINSON

*Attesting Officer*    *Acting Commissioner of Patents and Trademarks*